(12) United States Patent
Yakovleva et al.

(10) Patent No.: US 11,824,182 B2
(45) Date of Patent: Nov. 21, 2023

(54) BATTERY UTILIZING PRINTABLE LITHIUM

(71) Applicant: Livent USA Corp., Philadelphia, PA (US)

(72) Inventors: Marina Yakovleva, Gastonia, NC (US); Kenneth Brian Fitch, Cherryville, NC (US); Jian Xia, Belmont, NC (US); William Arthur Greeter, Jr., Dallas, NC (US)

(73) Assignee: Livent USA Corp., Philadelphia, PA (US)

( * ) Notice: Subject to any disclaimer, the term of this patent is extended or adjusted under 35 U.S.C. 154(b) by 8 days.

(21) Appl. No.: 17/586,128

(22) Filed: Jan. 27, 2022

(65) Prior Publication Data

US 2022/0149341 A1     May 12, 2022

Related U.S. Application Data

(63) Continuation of application No. 16/573,587, filed on Sep. 17, 2019, now Pat. No. 11,264,598, which is a
(Continued)

(51) Int. Cl.
*H01M 10/0565*     (2010.01)
*H01M 4/04*     (2006.01)
(Continued)

(52) U.S. Cl.
CPC ......... *H01M 4/0404* (2013.01); *H01M 4/366* (2013.01); *H01M 4/382* (2013.01);
(Continued)

(58) Field of Classification Search
CPC ......... H01M 10/0565; H01M 10/0525; H01M 4/139; H01M 4/0414; H01M 4/364;
(Continued)

(56) References Cited

U.S. PATENT DOCUMENTS

| 3,721,113 A | 3/1973 | Hovespian |
| 4,502,903 A | 3/1985 | Bruder |

(Continued)

FOREIGN PATENT DOCUMENTS

| CN | 104332657 B | 6/2016 |
| JP | 2008503865 | 2/2008 |

(Continued)

OTHER PUBLICATIONS

International Search Report/Written Opinion dated Jun. 26, 2019 in PCT/US2019/023376.
(Continued)

*Primary Examiner* — Cynthia K Walls
(74) *Attorney, Agent, or Firm* — Williams Mullen; F. Michael Sajovec

(57) ABSTRACT

A battery having a cathode and a composite anode is provided. In one embodiment, the composite anode may include a lithium metal anode, a solid electrolyte and at least one interface layer. The interface layer improves the uniformity of the surface of the solid electrolyte thereby optimizing contact between the surface of the lithium metal anode and the surface of the solid electrolyte for better battery performance. The anode and/or the interface may be formed of a printable lithium composition including lithium metal powder, a polymer binder compatible with the lithium metal powder, a rheology modifier compatible with the lithium metal powder, and a solvent compatible with the lithium metal powder and with the polymer binder. The cathode may be a composite cathode. In another embodiment, the printable lithium composition may be in the form of a foil or film.

4 Claims, 4 Drawing Sheets

Related U.S. Application Data continuation-in-part of application No. 16/359,733, filed on Mar. 20, 2019, now abandoned.

(60) Provisional application No. 62/874,269, filed on Jul. 15, 2019, provisional application No. 62/864,739, filed on Jun. 21, 2019, provisional application No. 62/691,819, filed on Jun. 29, 2018, provisional application No. 62/646,521, filed on Mar. 22, 2018.

(51) Int. Cl.
| | |
|---|---|
| H01M 4/38 | (2006.01) |
| H01M 4/62 | (2006.01) |
| H01M 10/0585 | (2010.01) |
| H01M 10/052 | (2010.01) |
| H01M 4/36 | (2006.01) |

(52) U.S. Cl.
CPC .......... *H01M 4/622* (2013.01); *H01M 4/628* (2013.01); *H01M 10/052* (2013.01); *H01M 10/0585* (2013.01)

(58) Field of Classification Search
CPC ...... H01M 4/485; H01M 4/602; H01M 4/624; H01M 4/1395; H01M 4/382; H01M 4/622; H01M 4/134; H01M 4/0411; H01M 4/0409; H01M 10/0585; H01M 10/052; H01M 4/0404; H01M 2004/027
See application file for complete search history.

(56) References Cited

U.S. PATENT DOCUMENTS

| | | |
|---|---|---|
| 4,948,635 A | 8/1990 | Iwasaki |
| 5,162,178 A | 11/1992 | Ohsawa |
| 5,318,600 A | 6/1994 | Schlaikjer et al. |
| 5,494,518 A | 2/1996 | Keane et al. |
| 5,567,474 A | 10/1996 | Dover et al. |
| 5,616,152 A | 4/1997 | Velasquez |
| 5,976,403 A | 11/1999 | Dover et al. |
| 6,232,014 B1 | 5/2001 | Shiota et al. |
| 6,555,268 B1 | 4/2003 | Inoue et al. |
| 6,706,447 B2 | 3/2004 | Gao et al. |
| 7,588,623 B2 | 9/2009 | Dover et al. |
| 7,765,949 B2 | 8/2010 | Fork |
| 7,780,812 B2 | 8/2010 | Fork |
| 7,851,083 B2 | 12/2010 | Zhu et al. |
| 7,906,233 B2 | 3/2011 | Wang et al. |
| 7,914,930 B2 | 3/2011 | Sato et al. |
| 7,922,471 B2 | 4/2011 | Fork |
| 8,021,496 B2 | 9/2011 | Yakovleva et al. |
| 8,088,509 B2 | 1/2012 | Shen et al. |
| 8,133,612 B2 | 3/2012 | Zou et al. |
| 8,158,282 B2 | 4/2012 | Zhamu et al. |
| 8,241,793 B2 | 8/2012 | Zhamu et al. |
| 8,252,438 B2 | 8/2012 | Han et al. |
| 8,276,695 B2 | 10/2012 | Han et al. |
| 8,377,236 B2 | 2/2013 | Yakovleva et al. |
| 8,778,522 B2 | 7/2014 | Visco et al. |
| 8,980,477 B2 | 3/2015 | Gao et al. |
| 9,385,397 B2 | 7/2016 | Zhamu et al. |
| 9,437,370 B2 | 9/2016 | Chen et al. |
| 9,515,321 B2 | 12/2016 | Yang et al. |
| 9,627,908 B2 | 4/2017 | Kaminsky et al. |
| 9,649,688 B2 | 5/2017 | Wietelmann et al. |
| 9,666,850 B2 | 5/2017 | Visco et al. |
| 9,711,297 B2 | 7/2017 | Raman et al. |
| 9,755,241 B2 | 9/2017 | Zhamu et al. |
| 9,780,358 B2 | 10/2017 | Masarapu et al. |
| 9,837,659 B2 | 12/2017 | Balogh et al. |
| 9,843,041 B2 | 12/2017 | Lopez et al. |
| 9,893,379 B2 | 2/2018 | Yi et al. |
| 9,923,195 B2 | 3/2018 | Amiruddin et al. |
| 9,941,505 B2 | 4/2018 | Shen et al. |
| 2004/0188880 A1 | 9/2004 | Bauer et al. |
| 2005/0130043 A1 | 6/2005 | Gao et al. |
| 2005/0239917 A1 | 10/2005 | Nelson et al. |
| 2006/0228468 A1 | 10/2006 | Lain et al. |
| 2007/0190422 A1 | 8/2007 | Morris |
| 2007/0275302 A1 | 11/2007 | Sotowa et al. |
| 2008/0274408 A1 | 11/2008 | Jarvis |
| 2012/0094188 A1 | 4/2012 | Visco et al. |
| 2012/0153211 A1 | 6/2012 | Fork et al. |
| 2012/0156364 A1 | 6/2012 | Fork et al. |
| 2013/0157106 A1 | 6/2013 | Lee et al. |
| 2014/0186519 A1 | 7/2014 | Cobb |
| 2014/0342209 A1 | 11/2014 | He et al. |
| 2014/0349185 A1 | 11/2014 | Momose |
| 2015/0086869 A1 | 3/2015 | Wang et al. |
| 2016/0028089 A1 | 1/2016 | Arpin et al. |
| 2016/0351893 A1 | 12/2016 | Wietelmann et al. |
| 2017/0040605 A1 | 2/2017 | Hwang et al. |
| 2017/0123443 A1 | 5/2017 | Kronmueller et al. |
| 2017/0149052 A1 | 5/2017 | Yakovleva et al. |
| 2017/0301485 A1 | 10/2017 | Cao et al. |
| 2017/0338475 A1* | 11/2017 | Laramie ................ H01M 4/139 |
| 2017/0365854 A1 | 12/2017 | Gopalakrishnannair et al. |
| 2018/0013126 A1 | 1/2018 | Ivanov et al. |
| 2018/0241079 A1 | 8/2018 | Duong et al. |
| 2018/0269471 A1 | 9/2018 | Lopez et al. |

FOREIGN PATENT DOCUMENTS

| | | |
|---|---|---|
| JP | 2009527095 | 7/2009 |
| JP | 2010160982 A | 7/2010 |
| JP | 2010160984 A | 7/2010 |
| JP | 2013065532 A | 4/2013 |
| JP | 2013243088 A | 12/2013 |
| JP | 2014120264 A | 6/2014 |
| JP | 2014175080 A | 9/2014 |
| JP | 2017098012 | 6/2017 |
| JP | 2017162812 | 9/2017 |
| JP | 2017174805 A | 9/2017 |
| WO | 2011008744 | 1/2011 |
| WO | 2017123443 | 7/2017 |
| WO | 2018025036 | 2/2018 |

OTHER PUBLICATIONS

International Search Report/Written Opinion dated Jun. 24, 2019 in PCT/US2019/023383.
International Search Report/Written Opinion dated Jun. 26, 2019 in PCT/US2019/023390.
Mashtalir et al., High-Purity Lithium Metal Film from Aqueous Mineral Solutions, American Chemical Society (ACS) Omega 2018, vol. 3 pp. 181-187.
International Search Report/Written Opinion dated Nov. 13, 2019 in PCT/US2019/051699.
International Search Report/Written Opinion dated Nov. 15, 2019 in PCT/US2019/051705.
International Preliminary Report on Patentability for International Application No. PCT/US2019/023390, dated Sep. 22, 2020.
International Preliminary Report on Patentability for International Application No. PCT/US2019/023376, dated Sep. 22, 2020.
International Preliminary Report on Patentability for International Application No. PCT/US2019/023383, dated Sep. 22, 2020.
International Search Report/ Written Opinion of the International Searching Authority dated Sep. 24, 2020 in PCT/US19/051705.
Australian Government, IP Australia, Examination Report No. 1 for Standard Patent Application, Patent Application No. 2019240246, dated Aug. 26, 2021, 6 pages.
Non-Final Office Action, U.S. Appl. No. 16/359,707, dated Sep. 1, 2021, 38 pages.
International Preliminary Report on Patentability, PCT/US2019/051705, dated Sep. 16, 2021, 9 pages.
Bitsch, Boris et al., "A novel slurry concept for the fabrication of lithium-ion battery electrodes with beneficial ; properties", Journal of Power Sources, 2014, vol. 265, pp. 81-90 See 2. Experimental; 4. Conclusions; and Fig. 6.

(56) References Cited

OTHER PUBLICATIONS

Office Action, JP 2021-500498, dated Dec. 9, 2021, 4 pages.
Office Action, JP 2021-500498, dated Dec. 9, 2021, 4 pages, English Translation.
Machine Translation of JP 2010-160984A.
Office Action, JP 2021-500496, dated Dec. 12, 2021, 4 pages English translation.
JP 2010-160982A, Jul. 11, 2010, Tanizaki Hiroaki et al., Machine translation.
JP 2013-065532A, Apr. 11, 2013, Teraki Kuniko et al., Machine translation.
JP 2013-243088A, Dec. 5, 2013, Shimoizumi Jun et al., Machine translation.
JP 2014-120264A, Jun. 30, 2014, Nakajima Mamoru et al., Machine translation.
JP 2014-175080A, Sep. 22, 2014, Shishihara Daisuke et al., Machine translation.
Office Action, JP 2021-500496, dated Dec. 21, 2021, 4 pages, English Translation.
JP 2017-174805A, Sep. 28, 2017, Machine Translation.
Machine Translation of JP 2017-174805A.
First Examination Report of Indian Patent Application No. 202137045734, dated Oct. 25, 2022.
United States Patent and Trademark Office (USPO), Office Action for U.S. Appl. No. 17/308,519, dated Apr. 6, 2023.
Japanese Patent Office, Office Action for JP Patent Application No. 2021-556513, dated Jun. 28, 2023.

* cited by examiner

BATTERY UTILIZING PRINTABLE LITHIUM

RELATED APPLICATIONS

The following application is a continuation of allowed U.S. Ser. No. 16/573,587 which claims priority to U.S. Provisional No. 62/874,269 filed Jul. 15, 2019, and U.S. Provisional No. 62/864,739 filed Jun. 21, 2019, and is a continuation-in-part of U.S. Ser. No. 16/359,733 filed Mar. 20, 2019 which claims priority to Provisional No. 62/646,521 filed Mar. 22, 2018 and U.S. Provisional No. 62/691,819 filed Jun. 29, 2018, each of the disclosures of which are incorporated by reference in their entireties.

FIELD OF THE INVENTION

The present invention relates to a battery which utilizes a printable lithium composition.

BACKGROUND OF THE INVENTION

Lithium and lithium-ion secondary or rechargeable batteries have found use in certain applications such as in cellular phones, camcorders, and laptop computers, and even more recently, in larger power application such as in electric vehicles and hybrid electric vehicles. It is preferred in these applications that the secondary batteries have the highest specific capacity possible but still provide safe operating conditions and good cyclability so that the high specific capacity is maintained in subsequent recharging and discharging cycles.

Although there are various constructions for secondary batteries, each construction includes a positive electrode (or cathode), a negative electrode (or anode), a separator that separates the cathode and anode, an electrolyte in electrochemical communication with the cathode and anode. For secondary lithium batteries, lithium ions are transferred from the anode to the cathode through the electrolyte when the secondary battery is being discharged, i.e., used for its specific application. During the discharge process, electrons are collected from the anode and pass to the cathode through an external circuit. When the secondary battery is being charged, or recharged, the lithium ions are transferred from the cathode to the anode through the electrolyte.

New lithium-ion cells or batteries are initially in a discharged state. During the first charge of lithium-ion cell, lithium moves from the cathode material to the anode active material. The lithium moving from the cathode to the anode reacts with an electrolyte material at the surface of the graphite anode, causing the formation of a passivation film on the anode. The passivation film formed on the graphite anode is a solid electrolyte interface (SEI). Upon subsequent discharge, the lithium consumed by the formation of the SEI is not returned to the cathode. This results in a lithium-ion cell having a smaller capacity compared to the initial charge capacity because some of the lithium has been consumed by the formation of the SEI. The partial consumption of the available lithium on the first cycle reduces the capacity of the lithium-ion cell. This phenomenon is called irreversible capacity and is known to consume about 10% to more than 20% of the capacity of a lithium ion cell. Thus, after the initial charge of a lithium-ion cell, the lithium-ion cell loses about 10% to more than 20% of its capacity.

One solution has been to use stabilized lithium metal powder to pre-lithiate the anode. For example, lithium powder can be stabilized by passivating the metal powder surface with carbon dioxide such as described in U.S. Pat. Nos. 5,567,474, 5,776,369, and 5,976,403, the disclosures of which are incorporated herein in their entireties by reference. The $CO_2$ passivated lithium metal powder can be used only in air with low moisture levels for a limited period of time before the lithium metal content decays because of the reaction of the lithium metal and air. Another solution is to apply a coating such as fluorine, wax, phosphorus or a polymer to the lithium metal powder such as described in U.S. Pat. Nos. 7,588,623, 8,021,496, 8,377,236 and U.S. Patent Publication No. 2017/0149052, for example.

There, however, remains a need for a solid-state battery having lithiated or prelithiated components for increased energy density and improved safety and manufacturability.

SUMMARY OF THE INVENTION

To this end, the present invention provides a solid-state battery with one or more components prelithiated, or lithiated with a printable lithium composition. A solid-state battery comprising the printable lithium composition will have increased energy density and improved safety and manufacturability.

In one embodiment, the battery may comprise a cathode and a composite anode. The composite anode may comprise a lithium metal anode and at least one interface layer between the lithium metal anode and a solid electrolyte. For example, the lithium metal anode and/or interface layer may be formed of a printable lithium composition comprised of lithium metal powder, a polymer binder compatible with the lithium metal powder, a rheology modifier compatible with the lithium metal powder, and a solvent compatible with the lithium metal powder and with the polymer binder. The interface layer may be added to a surface of the solid electrolyte to improve the uniformity of its surface and optimize contact between the surface of the lithium metal anode and the surface of the solid electrolyte leading to better battery performance. In another embodiment, the anode may be formed from a printable lithium formulation and serve as an interface layer.

In another embodiment, the lithium metal anode and/or interface layer may be comprised of a foil or film formed from a printable lithium composition comprising lithium metal powder, a polymer binder compatible with the lithium metal powder, and a rheology modifier compatible with the lithium metal powder and the polymer binder, wherein the rheology modifier provides a three-dimensional support structure for preventing the degradation and increasing the durability of the foil or film when coated with the printable lithium composition.

In some embodiments, the cathode may be a composite of non-lithiated cathode materials and printable Li metal; for example, a sulfur cathode can be prelithiated with printable Li and this composite cathode can paired with non-lithiated or prelithiated anode in solid-state batteries.

DETAILED DESCRIPTION OF THE INVENTION

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

The term "about," as used herein when referring to a measurable value such as an amount of a compound, dose, time, temperature, and the like, is meant to encompass variations of 20%, 10%, 5%, 1%, 0.5%, or even 0.1% of the specified amount. Unless otherwise defined, all terms, including technical and scientific terms used in the description, have the same meaning as commonly understood by one of ordinary skill in the art to which this invention belongs.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

As used herein, the term "consists essentially of" (and grammatical variants thereof), as applied to the compositions and methods of the present invention, means that the compositions/methods may contain additional components so long as the additional components do not materially alter the composition/method. The term "materially alter," as applied to a composition/method, refers to an increase or decrease in the effectiveness of the composition/method of at least about 20% or more.

All patents, patent applications and publications referred to herein are incorporated by reference in their entirety. In case of a conflict in terminology, the present specification is controlling.

Figure 1:
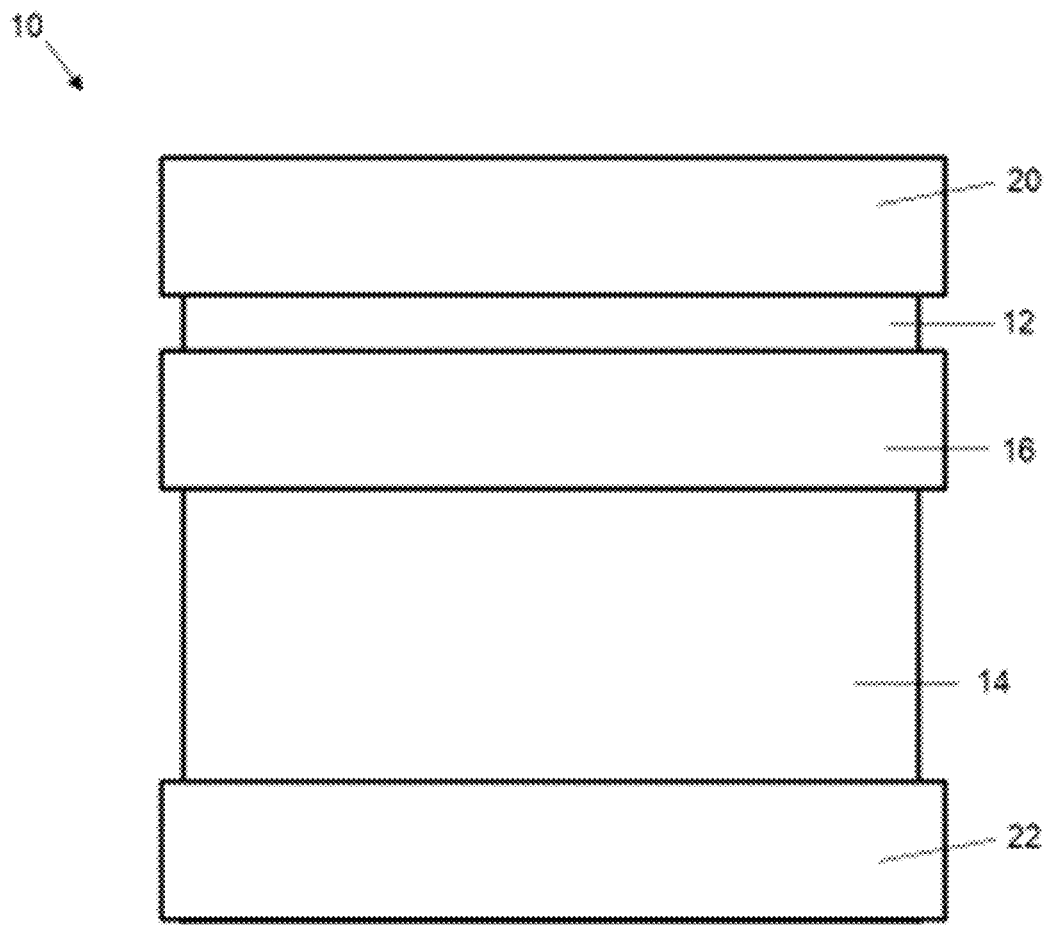
FIG. 1 is a schematic of a solid-state battery according to one embodiment of the present invention.

Referring now to FIG. 1, a solid-state battery 10 comprising an anode 12, a cathode 14 and a solid electrolyte 16 is provided in accordance with one embodiment of the present invention. The solid-state battery may further include an anode current collector 20 and a cathode current collector 22. In one embodiment, a printable lithium composition may be applied or deposited to a current collector, electrode and/or solid electrolyte of the solid-state battery.

For example, the printable lithium composition may be used to form a monolithic lithium metal anode of various thicknesses and widths for use in a solid-state battery, including solid-state batteries as described in U.S. Pat. Nos. 8,252,438 and 9,893,379 and incorporated herein by reference in their entireties. In yet another embodiment, the printable lithium composition may be applied or deposited so as to form a solid electrolyte for a solid-state battery, and includes combining the printable lithium composition with a polymer or ceramic material to form a solid electrolyte. The printable lithium composition may comprise a lithium metal powder, one or more polymer binders, one or more rheology modifiers and may further include a solvent or co-solvent.

The printable lithium composition may be applied to a current collector, electrode or solid electrolyte by various methods, including extruding, coating, printing, painting, dipping, and spraying as disclosed in U.S. application Ser. No. 16/359,725 and hereby incorporated by reference in its entirety. For example, the anode may be lithiated or pre-lithiated by printing the printable lithium composition onto the anode or a current collector, where the thin lithium film with controlled thickness and width could be formed, or coating the anode with the printable lithium composition.

The surfaces of typical solid electrolytes may be rough depending on the solid electrolyte selection and therefore may not form good contacts between the solid electrolyte and the lithium (foil) anode, leading to a sub-optimal interface and reduced battery performance. In one embodiment, the printable lithium composition may be used to prelithiate a solid electrolyte, forming an interface layer that improves the solid electrolyte surface and therefore provides for improved adhesion with a lithium anode. In another embodiment, the interface layer may comprise a foil or film formed from a printable lithium composition. The printable lithium composition forming the interface layer may be applied to various types of solid electrolytes, including polymer, glass, and ceramic electrolytes. Having a modified solid electrolyte surface optimizes contact between the solid electrolyte and a lithium anode, resulting in an improved interface between the solid electrolyte and lithium anode and leading to better battery performance by lessening the impedance growth caused by loss of contact between lithium and the electrolyte that occurs because of volume increase of the lithium during cycling.

Another example of a solid-state secondary battery may include a cathode capable of electrochemically absorbing and desorbing lithium; an anode capable of electrochemically absorbing and desorbing lithium, the anode including an active material layer that comprises an active material, the active material layer being carried on a current collector; and a non-aqueous electrolyte as described in U.S. Pat. No. 7,914,930 herein incorporated by reference in its entirety. A method includes the steps of: reacting lithium with the active material of the anode by bringing the printable lithium composition into contact with a surface of the active material layer of the anode; and thereafter combining the anode with the cathode to form an electrode assembly.

As disclosed in U.S. application Ser. No. 16/359,707 and hereby incorporated by reference in its entirety, the printable lithium composition comprises a lithium metal powder, a polymer binder, a rheology modifier and may further include a solvent. The polymer binder may be compatible with the lithium metal powder. The rheology modifier may be compatible with the lithium metal powder and the polymer binder. The solvent may be compatible with the lithium metal powder and with the polymer binder.

The lithium metal powder may be in the form of a finely divided powder. The lithium metal powder typically has a mean particle size of less than about 80 microns, often less than about 40 microns and sometimes less than about 20 microns. The lithium metal powder may be a low pyrophoricity stabilized lithium metal power (SLMP®) available from FMC Lithium Corp. The lithium metal powder may also include a substantially continuous layer or coating of fluorine, wax, phosphorus or a polymer or the combination thereof (as disclosed in U.S. Pat. Nos. 5,567,474, 5,776,369, and 5,976,403). Lithium metal powder has a significantly reduced reaction with moisture and air.

The lithium metal powder may also be alloyed with a metal. For example, the lithium metal powder may be alloyed with a Group I-VIII element. Suitable elements from Group IB may include, for example, silver or gold. Suitable elements from Group IIB may include, for example, zinc, cadmium, or mercury. Suitable elements from Group IIA of the Periodic Table may include beryllium, magnesium, calcium, strontium, barium, and radium. Elements from Group IIIA that may be used in the present invention may include, for example, boron, aluminum, gallium, indium, or thallium. Elements from Group IVA that may be used in the present invention may include, for example, carbon, silicon, germanium, tin, or lead. Elements from Group VA that may be used in the present invention may include, for example, nitrogen, phosphorus, or bismuth. Suitable elements from Group VIIIB may include, for example, palladium, or platinum.

The polymer binder is selected so as to be compatible with the lithium metal powder. "Compatible with" or "compatibility" is intended to convey that the polymer binder does not violently react with the lithium metal powder resulting in a safety hazard. The lithium metal powder and the polymer binder may react to form a lithium-polymer complex, however, such complex should be stable at various temperatures. It is recognized that the amount (concentration) of lithium and polymer binder contribute to the stability and reactivity. The polymer binder may have a molecular weight of about 1,000 to about 8,000,000, and often has a molecular weight of 2,000,000 to 5,000,000. Suitable polymer binders may include one or more of poly(ethylene oxide), polystyrene, polyisobutylene, natural rubbers, butadiene rubbers, styrene-butadiene rubber, polyisoprene rubbers, butyl rubbers, hydrogenated nitrile butadiene rubbers, epichlorohydrin rubbers, acrylate rubbers, silicon rubbers, nitrile rubbers, polyacrylic acid, polyvinylidene chloride, polyvinyl acetate, ethylene propylene diene termonomer, ethylenevinyl acetate copolymer, ethylene-propylene copolymers, ethylene-propylene terpolymers, polybutenes. The binder may also be a wax.

The rheology modifier is selected to be compatible with the lithium metal powder and the polymer binder. The rheology modifier provides rheology properties such as viscosity. The rheology modifier may also be multi-functional and provide conductivity, improved capacity and/or improved stability/safety depending on the selection of the rheology modifier. To this end, the rheology modifier may be the combination of two or more compounds so as to provide different properties or to provide additive properties. Exemplary rheology modifiers may include one or more of carbon black, carbon nanotubes, graphene, silicon nanotubes, graphite, hard carbon and mixtures, fumed silica, titanium dioxide, zirconium dioxide and other Group IIA, IIIA, IVB, VB and VIA elements/compounds and mixtures or blends thereof.

Solvents compatible with lithium may include acyclic hydrocarbons, cyclic hydrocarbons, aromatic hydrocarbons, symmetrical ethers, unsymmetrical ethers, cyclic ethers, alkanes, sulfones, mineral oil, and mixtures, blends or cosolvents thereof. Examples of suitable acyclic and cyclic hydrocarbons include n-hexane, n-heptane, cyclohexane, and the like. Examples of suitable aromatic hydrocarbons include toluene, ethylbenzene, xylene, isopropylbenzene (cumene), and the like. Examples of suitable symmetrical, unsymmetrical and cyclic ethers include di-n-butyl ether, methyl t-butyl ether, tetrahydrofuran, glymes and the like. Commercially available isoparaffinic synthetic hydrocarbon solvents with tailored boiling point ranges such as Shell Sol® (Shell Chemicals) or Isopa® (Exxon) are also suitable.

The polymer binder and solvents are selected to be compatible with each other and with the lithium metal powder. In general, the binder or solvent should be non-reactive with the lithium metal powder or in amounts so that any reaction is kept to a minimum and violent reactions are avoided. The binder and solvent should be compatible with each other at the temperatures at which the printable lithium composition is made and will be used. Preferably the solvent (or co-solvent) will have sufficient volatility to readily evaporate from the printable lithium composition (e.g., in slurry form) to provide drying of the printable lithium composition (slurry) after application.

The components of the printable lithium composition may be mixed together as a slurry or paste to have a high concentration of solid. Thus the slurry/paste may be in the form of a concentrate with not all of the solvent necessarily added prior to the time of depositing or applying. In one embodiment, the lithium metal powder should be uniformly suspended in the solvent so that when applied or deposited a substantially uniform distribution of lithium metal powder is deposited or applied. Dry lithium powder may be dispersed such as by agitating or stirring vigorously to apply high sheer forces.

In another embodiment, a mixture of the polymer binder, rheology modifier, coating reagents, and other potential additives for the lithium metal powder may be formed and introduced to contact the lithium droplets during the dispersion at a temperature above the lithium melting point, or at a lower temperature after the lithium dispersion has cooled such as described in U.S. Pat. No. 7,588,623 the disclosure of which is incorporated by reference in its entirety. The thusly modified lithium metal may be introduced in a dry powder form or in a solution form in a solvent of choice. It is understood that combinations of different process parameters could be used to achieve specific coating and lithium powder characteristics for particular applications.

Conventional pre-lithiation surface treatments require compositions having very low binder content and very high lithium; for example, see U.S. Pat. No. 9,649,688 the disclosure of which is incorporated by reference in its entirety. However, embodiments of the printable lithium composition in accordance with the present invention can accommodate higher binder ratios, including up to 20 percent on dry basis. Various properties of the printable lithium composition, such as viscosity and flow, may be modified by increasing the binder and modifier content up to 50% dry basis without loss of electrochemical activity of lithium. Increasing the binder content facilitates the loading of the printable lithium composition and the flow during printing. The printable lithium composition may comprise between about 50% to about 98% by weight of lithium metal powder and about 2% to about 50% by weight of polymer binder and rheology modifiers on a dry weight basis. In one embodiment, the printable lithium composition comprises between about 60% to about 90% by weight lithium metal powder and between about 10% to about 40% by weight of polymer binder and rheology modifiers. In another embodiment the printable lithium composition comprises between about 75% to about 85% by weight of lithium metal powder and between about 15% to about 30% by weight of polymer binder and rheology modifiers.

An important aspect of printable lithium compositions is the rheological stability of the suspension. Because lithium metal has a low density of 0.534 g/cc, it is difficult to prevent lithium powder from separating from solvent suspensions. By selection of lithium metal powder loading, polymer binder and conventional modifier types and amounts, viscosity and rheology may be tailored to create the stable suspension of the invention. A preferred embodiment shows no separation at greater than 90 days. This may be achieved by designing compositions with zero shear viscosity in the range of $1\times10^4$ cps to $1\times10^7$ cps, wherein such zero shear viscosity maintains the lithium in suspension particularly when in storage. When shear is applied, the suspension viscosity decreases to levels suitable for use in printing or coating applications.

The resulting printable lithium composition preferably may have a viscosity at 10 $s^{-1}$ about 20 to about 20,000 cps, and sometimes a viscosity of about 100 to about 2,000 cps, and often a viscosity of about 700 to about 1,100 cps. At such viscosity, the printable lithium composition is a flowable suspension or gel. The printable lithium composition preferably has an extended shelf life at room temperature and is stable against metallic lithium loss at temperatures up to 60° C., often up to 120° C., and sometimes up to 180° C. The printable lithium composition may separate somewhat over time but can be placed back into suspension by mild agitation and/or application of heat.

In one embodiment, the printable lithium composition comprises on a solution basis about 5 to 50 percent lithium metal powder, about 0.1 to 20 percent polymer binder, about 0.1 to 30 percent rheology modifier and about 50 to 95 percent solvent. In one embodiment, the printable lithium composition comprises on a solution basis about 15 to 25 percent lithium metal powder, about 0.3 to 0.6 percent polymer binder having a molecular weight of 4,700,000, about 0.5 to 0.9 percent rheology modifier, and about 75 to 85 percent solvent. Typically, the printable lithium composition is applied or deposited to a thickness of about 50 microns to 200 microns prior to pressing. After pressing, the thickness can be reduced to between about 1 to 50 microns. Examples of pressing techniques are described, for example, in U.S. Pat. Nos. 3,721,113 and 6,232,014 which are incorporated herein by reference in their entireties.

Another aspect of the present invention is directed to a solid-state battery wherein a current collector, electrode and/or solid electrolyte of the solid-state battery may comprise a substrate coated with a printable lithium composition as described in U.S. Ser. No. 16/359,707 and U.S. Ser. No. 16/359,725 both of which are incorporated by reference in their entirety. The printable lithium composition comprises lithium metal powder, a polymer binder compatible with the lithium metal powder, and a rheology modifier compatible with the lithium metal powder and the polymer binder, wherein the rheology modifier is dispersible within the composition and provides a three-dimensional support structure for preventing degradation and increasing the durability of the anode when made with the printable lithium composition.

In one embodiment, the rheology modifier is carbon-based. For example, the rheology modifier may be comprised of carbon nanotubes to provide a structure for a coated electrode. In another embodiment, carbon black may be added as a rheology modifier. Without wishing to be limited by theory, it is believed that the carbon-based rheology modifier may also provide a conductive network between lithium particles after pressing effectively increasing areal surface area and lowering areal current density during device operation and giving lithium ions a pathway to deposit in the bulk rather than just on the surface of the foil as occurs with regular lithium foil. Other examples of suitable rheology modifiers may include non carbon-based materials, including titanium oxides and silicon oxides. For example, silicon nanostructures such as nanotubes or nanoparticles may be added as a rheology modifier to provide a three-dimensional structure and/or added capacity. The rheology modifiers may also increase the durability of the layer (i.e., coating, foil or film) formed from the printable lithium composition by preventing mechanical degradation and allow for faster charging.

In one embodiment, the printable lithium composition may be applied onto a substrate, such as an energy storage device substrate. Examples may include a current collector, an anode, a cathode, and an electrolyte. Examples of electrolytes may include a solid electrolyte, a polymer electrolyte, a glass electrolyte, and a ceramic electrolyte. In one example, the printable lithium composition may be applied or deposited to prelithiate an anode or cathode. The prelithiated anode or cathode may be incorporated into an energy storage device such as a capacitor or battery. In another example, the substrate may be a lithium anode. For example, the lithium anode may be a flat lithium metal anode, or may be a lithium-carbon anode such as an amine functionalized lithium-carbon film as described in Niu et al. [*Nature Nanotechnology*, Vol. 14, pgs. 594-201 (2019); DOI: 10.1038/s41565-019-0427-9] and herein incorporated by reference in its entirety.

The printable lithium composition may be applied or deposited so as to form a solid electrolyte for a solid-state battery, and includes combining the printable lithium composition with a polymer, glass or ceramic material to form a solid electrolyte or a composite solid electrolyte. For example, the printable lithium composition and polymer material may be extruded together to create a solid electrolyte film, and optionally may include other active electrolyte materials.

In another embodiment, the substrate may comprise an electrode coated with a printable lithium composition, and further include a protective layer between the lithium layer and an electrolyte; for example, the protective layer described in U.S. Pat. No. 6,214,061 herein incorporated by reference in its entirety. The protective layer may be a glassy or amorphous material capable of conducting lithium ions and is adapted to prevent contact between the lithium surface and an electrolyte. Examples of suitable protective layers include lithium silicates, lithium borates, lithium aluminates, lithium phosphates, lithium phosphorous oxynitrides, lithium silicosulfides, lithium borosulfides, lithium aminosulfides and lithium phosphosulfides. The protective layer may be applied onto an electrode surface by a physical or chemical deposition process. The printable lithium composition may be applied onto the protective layer as a coating, foil or film. In one embodiment, the protective layer may be separating a lithium layer and electrolyte wherein the electrolyte may be comprised of a substrate coated with the printable lithium composition. The formulation may employ use of a semi-solid polymer binder, such as described by Li et al. [*Joule*, Vol. 3, No. 7, pgs. 1637-1646 (2019), DOI: 10.1016/j.joule.2019.05.022] and herein incorporated by reference in its entirety, in order to increase contact of lithium metal with the solid-state electrolyte and maintain contact during charge/discharge cycling.

One embodiment may comprise a battery with a scalable three-dimensional (3D) lithium metal anode; for example, as disclosed by Liu et al. [*Energy Storage Materials*, Vol. 16, pgs. 505-511 (2019), DOI: 10.1016/j.ensm.2018.09.021] and herein incorporated by reference in its entirety, wherein a cathode, electrolyte, 3D lithium metal anode, or a combination thereof may each comprise a substrate coated with a printable lithium composition.

Another embodiment may comprise a battery having a cathode, electrolyte and a lithium anode modified with $ZnI_2$ such as disclosed by Kolensikov et al. [*Journal of the Electrochemical Society*, vol. 166, no. 8, pages A1400-A1407 (2019), DOI: 10.1149/2.0401908jes] and herein incorporated by reference in its entirety. The lithium anode may be prepared by applying the printable lithium composition onto a copper foil and modified by placing the foil in contact with a $ZnI_2$ in tetrahydrofuran (THF) solution.

In another embodiment, the substrate may comprise a silicon-nanotube anode such as described by Forney et al. [*Nanoletters*, Vol. 13, no. 9, pages 4158-4163 (2013), DOI: 10.1021/nl40176d] and herein incorporated by reference. For example, the silicon-nanotube anode thereof may further include a lithium layer, such as a coating, foil or film, formed from the printable lithium composition.

The polymer binder is selected so as to be compatible with the lithium metal powder. "Compatible with" or "compatibility" is intended to convey that the polymer binder does not violently react with the lithium metal powder resulting in a safety hazard. The lithium metal powder and the polymer binder may react to form a lithium-polymer complex, however, such complex should be stable at various temperatures. It is recognized that the amount (concentration) of lithium and polymer binder contribute to the stability and reactivity. The polymer binder may have a molecular weight of about 1,000 to about 8,000,000, and often has a molecular weight of 2,000,000 to 5,000,000. Suitable polymer binders may include one or more of poly(ethylene oxide), polystyrene, polyisobutylene, natural rubbers, butadiene rubbers, styrene-butadiene rubber, polyisoprene rubbers, butyl rubbers, hydrogenated nitrile butadiene rubbers, epichlorohydrin rubbers, acrylate rubbers, silicon rubbers, nitrile rubbers, polyacrylic acid, polyvinylidene chloride, polyvinyl acetate, ethylene propylene diene termonomer, ethylenevinyl acetate copolymer, ethylene-propylene copolymers, ethylene-propylene terpolymers, polybutenes. The binder may also be a wax.

The rheology modifier is selected so as to be compatible with the lithium metal powder and the polymer binder and dispersible in the composition. A preferred embodiment of the printable lithium composition includes a carbon-based rheology modifier such as carbon nanotubes. Use of carbon nanotubes may also provide a three-dimensional support structure and conductive network for a lithium anode when coated with the printable lithium composition and increase its surface area. Another support structure may be one as described by Cui et al. [*Science Advances*, Vol. 4, no. 7, page 5168, DOI: 10.1126/sciadv.aat5168], incorporated herein by reference in its entirety, which uses a hollow carbon sphere as a stable host that prevents parasitic reactions, resulting in improved cycling behavior. Yet another support structure may be a nanowire as described in U.S. Pat. No. 10,090,512 incorporated herein by reference in its entirety. Other compatible carbon-based rheology modifiers include carbon black, graphene, graphite, hard carbon and mixtures or blends thereof.

Additional rheology modifiers may be added to the composition to modify properties such as viscosity and flow under shear conditions. The rheology modifier may also provide conductivity, improved capacity and/or improved stability/safety depending on the selection of the rheology modifier. To this end, the rheology modifier may be the combination of two or more compounds so as to provide different properties or to provide additive properties. Exemplary rheology modifiers may include one or more of silicon nanotubes, fumed silica, titanium dioxide, zirconium dioxide and other Group IIA, IIIA, IVB, VB and VIA elements/compounds and mixtures or blends thereof. Other additives intended to increase lithium ion conductivity can be used; for example, electrochemical device electrolyte salts such as lithium perchlorate ($LiClO_4$), lithium hexafluorophosphate ($LiPF_6$), lithium difluoro(oxalate)borate (LiDFOB), lithium tetrafluoroborate ($LiBF_4$), lithium nitrate ($LiNO_3$), lithium-bis(oxalate) borate (LiBOB), lithium trifluoromethanesulfonimide (LiTFSI), lithium bis(fluorosulfonyl) imide (LiFSI).

In another embodiment, a mixture of the polymer binder, rheology modifier, coating reagents, and other potential additives for the lithium metal powder may be formed and introduced to contact the lithium droplets during dispersion at a temperature above the lithium melting point, or at a lower temperature after the lithium dispersion has cooled such as described in U.S. Pat. No. 7,588,623 the disclosure of which is incorporated by reference in its entirety. The thusly modified lithium metal may be introduced in a dry powder form or in a solution form in a solvent of choice. It is understood that combinations of different process parameters could be used to achieve specific coating and lithium powder characteristics for particular applications.

The printable lithium composition may be in the form of a foil or a film as described in U.S. Provisional Application No. 62/864,739 and herein incorporated by reference in its entirety. In one embodiment, the foil or film formed from the printable lithium composition may be applied to a substrate for use in one or more components in a battery. For instance, the battery may include a cathode, an electrolyte and an anode with a substrate coated with the printable lithium composition. The electrolyte may have a concentration of above 1 M, often equal to about 3 M or higher, and sometimes above 5 M. Examples of suitable electrolytes include lithium perchlorate ($LiClO_4$), lithium hexafluorophosphate ($LiPF_6$), lithium difluoro(oxalate)borate (LiDFOB), lithium tetrafluoroborate ($LiBF_4$), lithium nitrate ($LiNO_3$), lithium bis(oxalate) borate (LiBOB), lithium bis(fluorosulfonyl) imide (LiFSI) and lithium trifluoromethanesulfonimide (LiTFSI) and mixtures or blends thereof. One exemplary example is a battery having a cathode and an anode with a substrate coated with the printable lithium composition and a high concentration electrolyte, wherein LiFSI is the major salt of the high concentration electrolyte. Another example is a battery having a cathode and an anode with a substrate coated with the printable lithium composition and a dual-salt liquid electrolyte as described by Weber et al [*Nature Energy*, Vol. 4, pgs. 683-689 (2019), DOI: 10.1038/s41560-019-0428-9] and U.S. Publication No. 2019/0036171, both of which are incorporated herein by reference. The dual-salt liquid electrolyte may be comprised of lithium difluoro(oxalate)borate (LiDFOB) and $LiBF_4$, and may have a concentration of about 1 M. Dual-salt electrolytes may provide increased initial capacity retentions and improved cycle performance.

In one embodiment, the printable lithium composition is deposited or applied to an active anode material on a current collector namely to form a prelithiated anode. Suitable active anode materials include graphite and other carbon-based materials, alloys such as tin/cobalt, tin/cobalt/carbon, silicon-carbon, variety of silicone/tin based composite compounds, germanium-based composites, titanium-based composites, elemental silicon, and germanium. The anode materials may be a foil, mesh or foam. Application may be via spraying, extruding, coating, printing, painting, dipping, and spraying, and are described in co-pending U.S. Patent Publication Ser. No. 16/359,725, and incorporated herein by reference in its entirety.

In one embodiment, the active anode material and the printable lithium composition are provided together and extruded onto the current collector (e.g., copper, nickel, etc.). For instance, the active anode material and printable lithium composition may be mixed and co-extruded together. Examples of active anode materials include graphite, graphite-SiO, graphite-SnO, SiO, hard carbon and other lithium ion battery and lithium ion capacitor anode materials. In another embodiment, the active anode material and the printable lithium composition are co-extruded to form a layer of the printable lithium composition on the current collector. The deposition of the printable lithium composition including the above extrusion technique may include depositing as wide variety patterns (e.g., dots, stripes), thicknesses, widths, etc. For example, the printable lithium composition and active anode material may be deposited as a series of stripes, such as described in U.S. Publication No. 2014/0186519 incorporated herein by reference in its entirety. The stripes would form a 3D structure that would account for expansion of the active anode material during lithiation. For example, silicon may expand by 300 to 400 percent during lithiation. Such swelling potentially adversely affects the anode and its performance. By depositing the printable lithium as a thin stripe in the Y-plane as an alternating pattern between the silicon anode stripes, the silicon anode material can expand in the X-plane alleviating electrochemical grinding and loss of particle electrical contact. Thus, the printing method can provide a buffer for expansion. In another example, where the printable lithium formulation is used to form the anode, it could be co-extruded in a layered fashion along with the cathode and separator, resulting in a solid-state battery.

In one embodiment, the printable lithium composition may be used to pre-lithiate an anode as described in U.S. Pat. No. 9,837,659 herein incorporated by reference in its entirety. For example, the method includes disposing a layer of printable lithium composition adjacent to a surface of a pre-fabricated/pre-formed anode. The pre-fabricated electrode comprises an electroactive material. In certain variations, the printable lithium composition may be applied to the carrier/substrate via a deposition process. A carrier substrate on which the layer of printable lithium composition may be disposed may be selected from the group consisting of: polymer films (e.g., polystyrene, polyethylene, polyethylene oxide, polyester, polypropylene, poly-polytetrafluoroethylene), ceramic films, copper foil, nickel foil, or metal foams by way of non-limiting example. Heat may then be applied to the printable lithium composition layer on the substrate or the pre-fabricated anode. The printable lithium composition layer on the substrate or the pre-fabricated anode may be further compressed together, under applied pressure. The heating, and optional applied pressure, facilitates transfer of lithium onto the surface of the substrate or anode. In case of transfer to the pre-fabricated anode, pressure and heat can result in mechanical lithiation, especially where the pre-fabricated anode comprises graphite. In this manner, lithium transfers to the electrode and due to favorable thermodynamics is incorporated into the active material.

In additional embodiments, at least a portion of the printable lithium composition can be supplied to the anode active material prior to the formation process of the battery. In other words, the anode can comprise a partially lithium-loaded silicon-based active material as described in U.S. Publication No. 2018/0269471 herein incorporated by reference, in which the partially loaded active material has a selected degree of loading of lithium through intercalation/alloying or the like.

Certain embodiments of the battery may utilize a composite cathode. For example, the battery may include a sulfur cathode, such as described in U.S. Pat. Nos. 9,882,238 and 9,917,303 and herein incorporated by reference in their entireties.

In one embodiment, the printable lithium composition may be incorporated into a three-dimensional electrode structure as described in U.S. Publication No. 2018/0013126 herein incorporated by reference in its entirety. For example, the printable lithium composition may be incorporated into a three-dimensional porous anode, porous current collector or porous polymer or ceramic film, wherein the printable lithium composition may be deposited therein. The printable lithium composition may be incorporated into a solid electrolyte, wherein the solid electrolyte may be combined with or applied to a lithium metal anode to form a composite anode. The solid electrolyte may be applied as one or more interface ion conductive electrolyte layers or interfaces to the lithium metal anode. One example is described in U.S. Pat. No. 8,182,943 herein incorporated by reference in its entirety.

In another embodiment, the printable lithium composition may be incorporated into a three-dimensional electrode structure as described in U.S. Publication No. 2018/0013126 herein incorporated by reference in its entirety. The three-dimensional electrode may be a permeable composite material comprised of a support defining pores and an alkali metal deposit on the support, wherein the alkali metal is deposited using a printable lithium composition. The three-dimensional electrode may have a porosity between about 1% by volume to about 95% by volume, and may have a mean flow pore size in the range of from about 1 nm to about 300 μm.

Another embodiment of the battery may include a composite anode formed using a pulsed electron beam as described in U.S. Pat. No. 10,047,432 herein incorporated by reference in its entirety. For example, the pulsed electron beam may be used as a virtual cathode deposition (VCD) process applied to an anode material, wherein a three-dimensional porous anode structure is created using the electron beam. The three-dimensional structure formed from the pulsed electron beam may be a carbon allotrope for lithium ion batteries (CALIB). The CALIB structure may be deposited with lithium using a printable lithium composition to form a carbon polymorph.

In some embodiments, an electrode prelithiated with the printable lithium composition can be assembled into a cell with the electrode to be preloaded with lithium. A separator can be placed between the respective electrodes. Current can be allowed to flow between the electrodes. For example, an anode prelithiated with the printable lithium composition of the present invention may be formed into a second battery such as described in U.S. Pat. No. 6,706,447 herein incorporated by reference in its entirety.

The cathode is formed of an active material, which is typically combined with a carbonaceous material and a binder polymer. The active material used in the cathode is preferably a material that can be lithiated. Preferably, non-lithiated materials such as $MnO_2$, $V_2O_5$, $MoS_2$, metal fluorides or mixtures thereof, Sulphur and sulfur composites can be used as the active material. However, lithiated materials such as $LiMn_2O_4$ and $LiMO_2$ wherein M is Ni, Co or Mn that can be further lithiated can also be used. The non-lithiated active materials are preferred because they generally have higher specific capacities, lower cost and broader choice of cathode materials in this construction that can provide increased energy and power over conventional secondary batteries that include lithiated active materials.

EXAMPLES

Example 1

Figure 3:
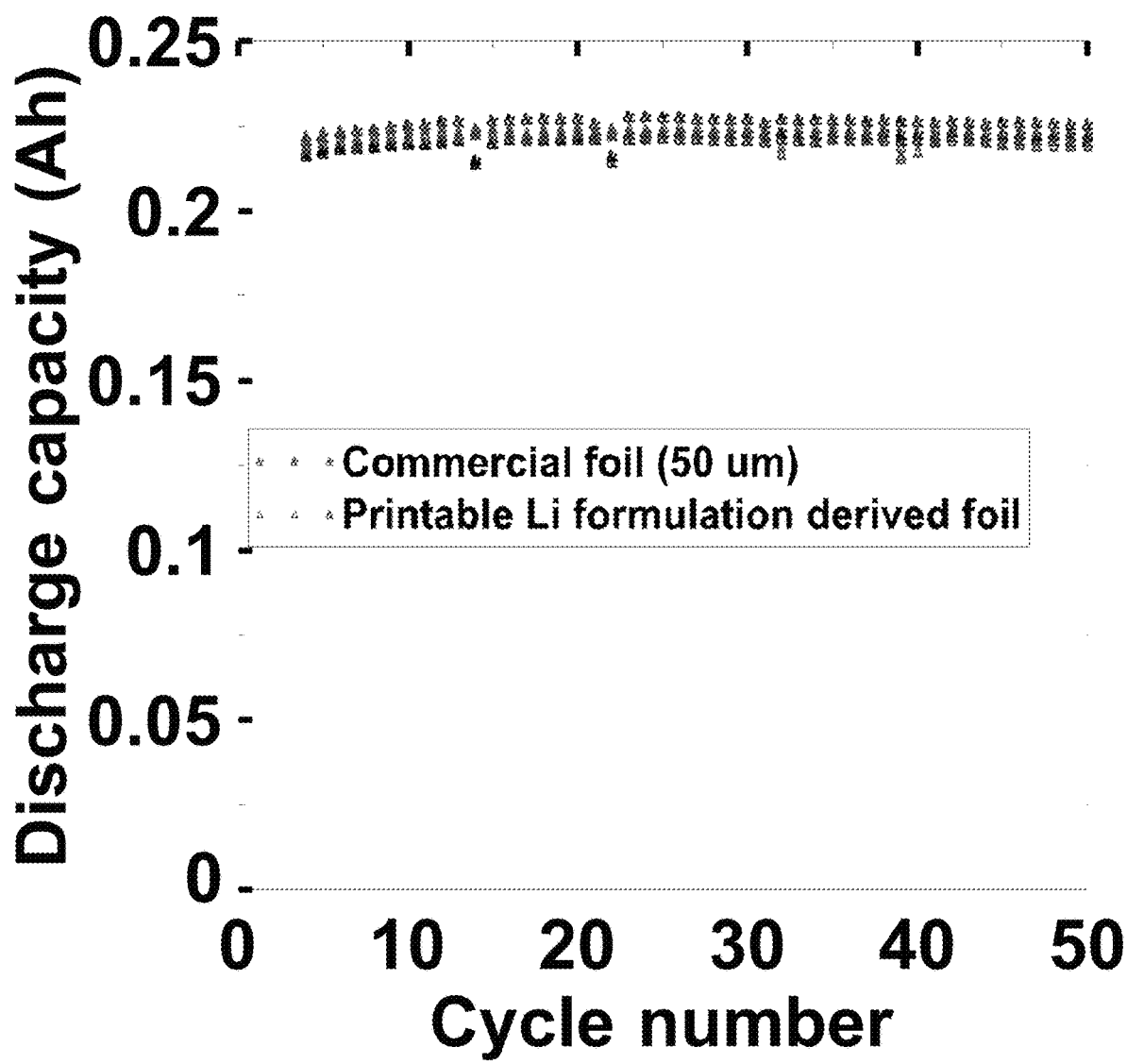
FIG. 3 is a plot showing the cycle performance for a pouch cell with printable lithium derived thin lithium film as the anode vs. commercial thin lithium foil.

10 g of solution styrene butadiene rubber (S-SBR Europrene Sol R 72613) is dissolved in 90 g toluene (99% anhydrous, Sigma Aldrich) by stirring at 21° C. for 12 hours. 6 g of the 10 wt % SBR (polymer binder) in toluene (solvent) is combined with 0.1 g carbon black (Timcal Super P) (rheology modifier) and 16 g of toluene and dispersed in a Thinky ARE 250 planetary mixer for 6 minutes at 2000 rpm. 9.3 g of stabilized lithium metal powder (SLMP®, FMC Lithium Corp.) having polymer coating of 20 to 200 nm and d50 of 20 µm is added to this suspension and dispersed for 3 minutes at 1000 rpm in a Thinky mixer. The printable lithium is then filtered through 180 µm opening stainless steel mesh. The printable lithium suspension is then doctor blade coated on to a copper current collector at a wet thickness of 2 mil (~50 µm). FIG. 3 is a plot showing the cycle performance for a pouch cell with printable lithium derived thin 20 micron lithium film as the anode vs. commercial 50 micron lithium foil.

Example 2

10 g of 135,000 molecular weight ethylene propylene diene terpolymer (EPDM) (Dow Nordel IP 4725P) is dissolved in 90 g p-xylene (99% anhydrous, Sigma Aldrich) by stirring at 21° C. for 12 hours. 6 g of the 10 wt % EPDM (polymer binder) in p-xylene (solvent) is combined with 0.1 g TiO2 (Evonik Industries) (rheology modifier) and 16 g of toluene and dispersed in a Thinky ARE 250 planetary mixer for 6 minutes at 2000 rpm. 9.3 g of stabilized lithium metal powder (SLMP®, Corp.) having polymer coating of 20 to 200 nm and d50 of 20 µm is added to this suspension and dispersed for 3 minutes at 1000 rpm in a Thinky mixer. The printable lithium is then filtered through 180 µm opening stainless steel mesh. The printable lithium composition is then doctor blade coated on to a copper current collector at a wet thickness of 2 mil (~50 µm).

Example 3

1.5 g of 1.27M molecular weight of PIB is dissolved in 85 g Toluene by stirring at 21° C. for 12 hours. 1.5 g of carbon nanotube was then added to the solution and continuous stirring for ~1 h to form a homogeneous suspension. 30 g of stabilized lithium metal powder (SLMP®, FMCLithium Corp.) having a polymer coating of 20 to 200 nm and d50 of 20 µm is added to this suspension and dispersed for 3 minutes at 1000 rpm in a Thinky mixer. The printable lithium suspension is then filtered through 180 µm opening stainless steel mesh. The printable lithium composition is then printed on to a copper current collector at a wet thickness of 2 mil (~50 µm) and a dry thickness of about 25 µm before lamination.

Shelf Life Stability

Figure 2:
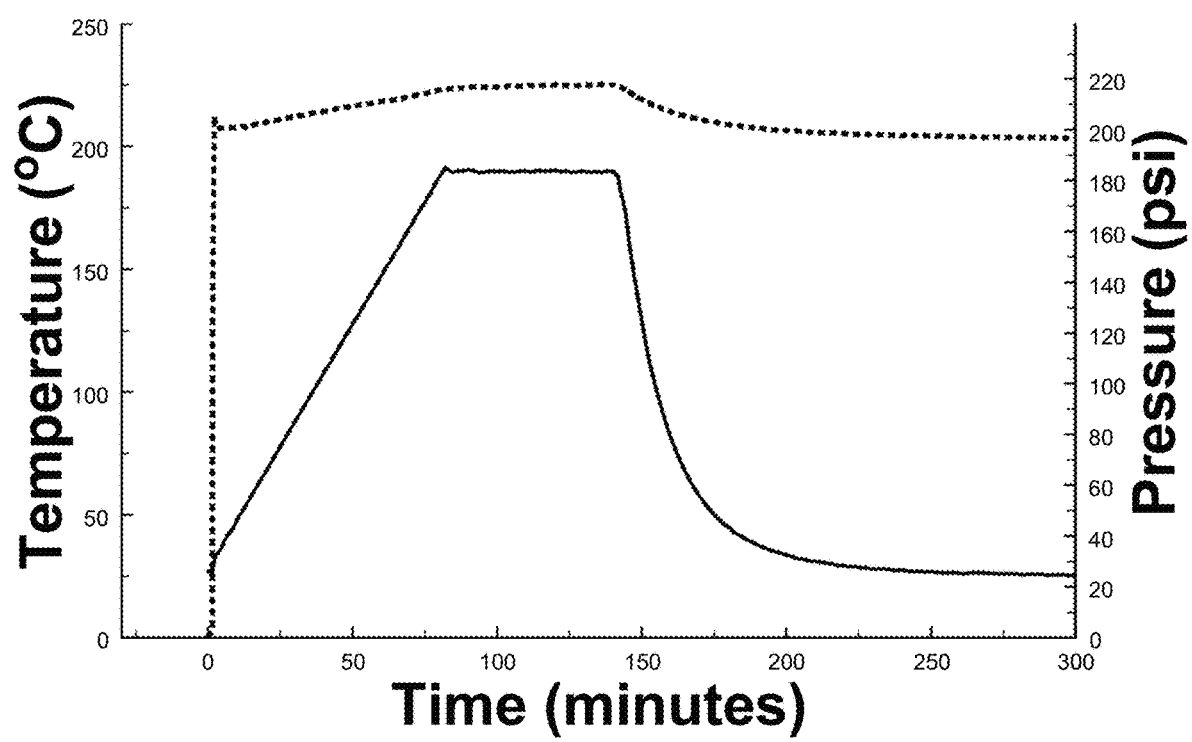
FIG. 2 is a temperature and pressure profile for the reactivity testing of SLMP/styrene butadiene/toluene printable lithium composition.

Printable lithium components must be selected to ensure chemical stability for long shelf life at room temperature and stability at elevated temperature for shorter durations such as during transport or during the drying process. The printable lithium composition stability was tested using calorimetry. 1.5 g SLMP was added to a 10 ml volume Hastelloy ARC bomb sample container. 2.4 g of 4% SBR binder solution was added to the container. The container was fitted with a 24-ohm resistance heater and a thermocouple to monitor and control sample temperature. The bomb sample set-up was loaded into a 350 ml containment vessel along with insulation. An Advance Reactive Screening Systems Tool calorimeter by Fauske Industries was used to assess the compatibility of the printable lithium solutions during a constant rate temperature ramp to 190° C. The temperature ramp rate was 2° C./min and the sample temperature was held at 190° C. for 60 minutes. The test was conducted under 200 psi Argon pressure to prevent boiling of the solvent. FIG. 2 shows the temperature and pressure profiles for the reactivity testing of a SLMP/styrene butadiene/toluene printable lithium composition.

Printing Performance

The quality of the printable lithium composition with regard to printability is measured by several factors, for example, consistency of flow which directly impact one's ability to control lithium loading on a substrate or an electrode surface. An effective means of measuring flow is Flow Conductance which is an expression of the loading per square centimeter in relation to the factors which control the loading—the pressure during extrusion and the speed of the printer head. It can most simply be thought of as the inverse of flow resistance.

The expression is used to allow comparisons between prints of varying pressures and speeds, and changes in Flow Conductance can alert one to non-linear relationships of flow with pressure. These are important for scaling the loading for a printable lithium up or down depending on the need of the anode or cathode. An ideal printable lithium composition would behave in a linear fashion to changes in extrusion pressure.

To test printability, a printable lithium composition is filtered through 180 µm opening stainless steel mesh and loaded into a Nordson EFD 10 ml syringe. The syringe is loaded into a Nordson EFD HP4x syringe dispenser and attached to a slot die print head. The slot die print head is equipped with a 100 µm-300 µm thick shim with channel openings designed to deliver the desired printable lithium composition loading. The slot die head is mounted on a Loctite 300 Series robot. The print head speed is set to 200 mm/s and the printing pressure is between 20 and 200 psi argon, depending on shim and channel design. The print length is 14 cm. In an example printing trial experiment, the printable lithium composition was printed 30 times from a single syringe at dispenser settings ranging from 80 psi to 200 psi. For this print trial experiment, the flow conductance average was $$0.14 \frac{mg}{s * cm^2} * \frac{lbf}{in^2}$$

with standard deviation of 0.02. Although this printable composition does not behave in a perfectly linear fashion, the composition flow response to changes in dispenser pressure is predictable to allow one skilled in the art to fine tune lithium loading to the desired level. Thus, at fixed dispenser pressure conditions the loading of lithium can be controlled very consistently. For example, for a print of $$0.275 \frac{mAh}{cm^2}$$

lithium metal, the coefficient of variance is about 5%.

Electrochemical Testing

The pre-lithiation effect of printable lithium composition can be evaluated by printing the required amount of printable lithium onto the surface of prefabricated electrodes. The pre-lithiation lithium amount is determined by testing the anode material in half-cell format and calculating the lithium required to compensate for the first cycle losses due to formation of SEI, or other side reactions. To calculate the necessary amount of printable lithium, the capacity as lithium metal of the composition must be known and is approximately 3600 mAh/g dry lithium basis for the compositions used as examples.

The pre-lithiation effect is tested using Graphite-SiO/NCA pouch cells. The Graphite-SiO anode sheet has the following formulation: artificial graphite (90.06%)+SiO (4.74%)+carbon black (1.4%)+SBR/CMC (3.8%). The capacity loading of the electrode is 3.59 mAh/cm² with 87% first cycle CE (columbic efficiency). The printable lithium is applied onto a Graphite-SiO anode at 0.15 mg/cm² lithium metal. The electrode is dried at 80° C. for 100 min followed by lamination at a roller gap approximately 75% of the thickness of the electrode. A 7 cm×7 cm electrode is punched from the printable lithium treated anode sheet. The positive electrode has the following formulation: NCA (96%)+carbon black (2%)+PVdF (2%). The positive electrode is 6.8 cm×6.8 cm with capacity loading of 3.37 mAh/cm². The NCA cathode has 90% first cycle CE. The anode to cathode capacity ratio is 1.06 and the baseline for full cell first cycle CE is 77%. Single layer pouch cells are assembled and 1M LiPF$_6$/EC+DEC (1:1) is used as the electrolyte. The cells are pre-conditioned for 12 hours at 21° C. and then the formation cycle is conducted at 40° C. The formation protocol is 0.1 C charge to 4.2V, constant voltage to 0.01 C and 0.1 C discharge to 2.8V. In the described test 89% first cycle CE was demonstrated.

Figure 4:
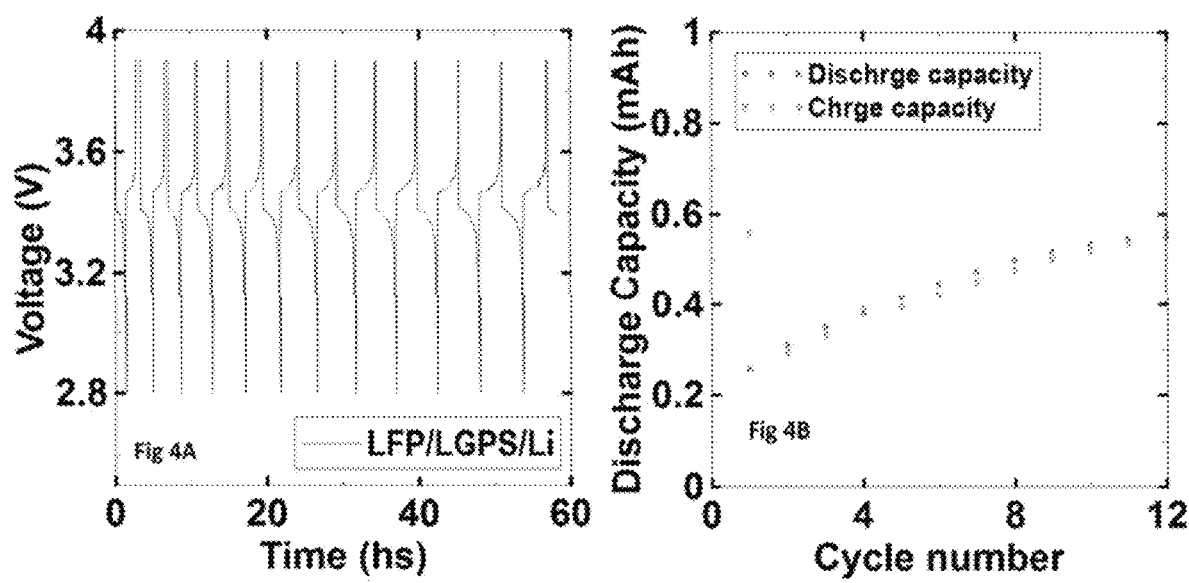
FIG. 4A is a plot showing the cycling voltage of a coin-type all solid-state battery with a LiFePO$_4$ (LFP) cathode, a Li$_{10}$GeP$_2$S$_{12}$ (LGPS) solid electrolyte and an anode comprising a printable lithium composition.
FIG. 4B is a plot showing the charge capacity and discharge capacity versus cycle number for one embodiment at 70° C.

The printable Li anode is tested in coin type all-solid state batteries. The printed lithium anode electrode in Example 3 is dried at 110° C. for 2 min in a dry room (RH<1% at 21° C.) and is cut into 12 mm disks. The cathode electrode is made by pressing 6.6 mg of a powder mixture composed of LiFePO4 (LFP):Li10GeP2S12 (LGPS)=7:3 wt % ratio using a dry pellet die press (MTI Corp. EQ-Die-12D-B). The pressure applied is 50,000 psi. Then, 99.6 mg LGPS powder is spread on top of the cathode electrode. This powder is then pressed into a solid electrolyte film using the same pressure (50,000 psi). The Li anode is then placed on top of a solid electrolyte film and pressed using a pressure of 25,000 psi. The all solid state battery is then tested in a pressure-controlled (up to 20 MPa) Split Coin cell (MTI Corp, part number: EQ-PSC) at 70° C. at a current density of C/10 with cycling between 2.8 and 3.8 V. FIG. 4A shows the cycling voltage of the coin-type all solid-state battery with LFP cathode, LGPS solid electrolyte and printable Li as the anode. FIG. 4A shows the all solid-state battery has the typical LFP charging voltage plateau of 3.5 V and discharge voltage plateau of about 3.4V. FIG. 4B shows the charge capacity and discharge capacity versus cycle number for the all solid state batteries cycle at 70° C. The all solid-state batteries cycled well during the first 12 cycles.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

That which is claimed is:

1. A battery comprising:
   a cathode;
   an anode formed from a first printable lithium composition comprised of a first lithium metal powder, a first polymer binder compatible with the lithium metal powder, a first rheology modifier compatible with the first lithium metal powder, and a first solvent compatible with the first lithium metal powder and with the first polymer binder; and
   at least one interface layer applied to the anode forming a composite anode, wherein the interface layer is formed from a second printable lithium composition comprised of a second lithium metal powder, a second polymer binder compatible with the second lithium metal powder, a second rheology modifier compatible with the second lithium metal powder, and a second solvent compatible with the second lithium metal powder and with the second polymer binder, wherein the interface layer improves the uniformity of the surface of the solid electrolyte thereby optimizing contact between the surface of the lithium metal anode and the surface of the solid electrolyte for better battery performance.

2. The battery of claim 1, wherein the interface layer comprises a foil or film.

3. A battery comprising:
   a cathode;
   an anode comprising a substrate coated with a printable lithium composition comprising lithium metal powder, a polymer binder compatible with the lithium metal powder, and a rheology modifier compatible with the lithium metal powder and the polymer binder providing a three-dimensional support structure for preventing degradation and increasing the durability of the substrate when coated with the printable lithium composition, wherein the printable lithium composition comprises between about 70% to about 85% by weight of the lithium metal powder and between about 15% to about 30% by weight of the polymer binder and the rheology modifier;
   and, at least one interface layer applied to the anode forming a protected composite anode wherein the interface layer is formed from a second printable lithium composition comprised of a second lithium metal powder, a second polymer binder compatible with the second lithium metal powder, a second rheology modifier compatible with the second lithium metal powder, and a solvent compatible with the second lithium metal powder and with the second polymer binder, wherein the second printable lithium comprises between about 70% to about 85% by weight of the lithium metal powder and between about 15% to about 30% by weight of the polymer binder and the rheology modifier.

4. The battery of claim 3, wherein the interface layer comprises a foil or film.

\* \* \* \* \*